US005517172A

United States Patent [19]

Chiu

[11] Patent Number: 5,517,172

[45] Date of Patent: May 14, 1996

[54] METHOD AND APPARATUS FOR POWERING AND SIGNALING OVER A SINGLE WIRE PAIR

[76] Inventor: Manfred F. Chiu, P.O. Box 2353, Cupertino, Calif. 95015-2353

[21] Appl. No.: 308,749

[22] Filed: Sep. 19, 1994

[51] Int. Cl.[6] .................... H04M 11/04

[52] U.S. Cl. .................... 340/310.01; 340/310.02; 340/310.06; 340/310.08; 235/449; 235/382

[58] Field of Search .................... 340/310.01, 310.02, 340/310.03, 310.06, 310.07, 310.08, 825.31, 825.32, 825.34, 825.63; 235/449, 238

[56] References Cited

U.S. PATENT DOCUMENTS

| | | | |
|---|---|---|---|
| 3,978,468 | 8/1976 | Bond et al. | 340/310.01 |
| 4,131,882 | 12/1978 | Hollabaugh et al. | 340/310.01 |
| 4,272,758 | 6/1981 | Giraud | 340/310.01 |
| 4,367,455 | 1/1983 | Fried | 340/310.01 |
| 4,463,341 | 7/1984 | Iwasaki | 340/310.01 |
| 4,580,276 | 4/1986 | Audruzzi et al. | 340/310.02 |
| 4,589,075 | 5/1986 | Buennagel | 340/310.01 |
| 4,623,871 | 11/1986 | Akano | 340/310.05 |
| 4,633,217 | 12/1986 | Akano | 340/310.05 |
| 4,672,280 | 6/1987 | Honjo | 340/310.01 |
| 4,744,493 | 5/1988 | Ikesue et al. | 222/167 |
| 4,808,803 | 2/1989 | Magier et al. | 235/382 |
| 4,864,274 | 9/1989 | Black | 340/310.02 |
| 4,949,066 | 8/1990 | Reinhardt | 340/310.02 |
| 4,962,496 | 10/1990 | Vercellotti et al. | 340/310.02 |
| 4,968,970 | 11/1990 | LaPorte | 340/310.02 |
| 4,992,774 | 2/1991 | McCullough | 340/310.01 |
| 5,031,082 | 7/1991 | Bierend | 340/310.02 |
| 5,070,442 | 12/1991 | Syron-Townson et al. | 340/310.01 |
| 5,142,278 | 8/1992 | Moallemi et al. | 340/825.06 |
| 5,148,144 | 9/1992 | Sutterlin et al. | 340/310.01 |
| 5,406,248 | 4/1995 | Le Van Suu | 340/310.01 |

*Primary Examiner*—Brent A. Swarthout
*Assistant Examiner*—Niner Tong
*Attorney, Agent, or Firm*—Edward B. Weller

[57] ABSTRACT

A remote access granting system has a remote access requester that reads an identification code from a magnetic strip on a card and provides a sequence of request signals indicative of logical ones and zeros on separate conductors to a remote access interface. In response to the request signals, the remote access interface pulse modulates a DC voltage signal on a transmission line with a request pulse having a first pulsewidth indicative of a logical one or with a request pulse having a second pulsewidth indicative of a logical zero. A controller interface detects the pulse modulation on the DC voltage signal, demodulates the request pulses, and provides on separate conductors to a controller a first request pulse indicative of a logical one and a second request pulse indicative of a logical zero. The controller determines whether the sequence of request pulses matches a predetermined sequence. If there is a match, the controller provides a lamp enable signal indicative that access is being granted to the controller interface which in turn pulse modulates the DC voltage signal on the transmission line with an access granted signal having an amplitude less than the amplitude of the request pulses and having a frequency different than the frequency of the request pulses. The remote access interface demodulates the access granted signal and provides the lamp enable signal to the remote access requester to enable entry through a security door and to inform the user that such access has been granted.

5 Claims, 5 Drawing Sheets

METHOD AND APPARATUS FOR POWERING AND SIGNALING OVER A SINGLE WIRE PAIR

FIELD OF THE INVENTION

This invention relates to access control systems, and, more particularly, to communicating access control signals between a remote access requester and a remote access controller.

BACKGROUND OF THE INVENTION

Unmanned security doors allow access to restricted areas by receiving from a user input commands for requesting access to the secured area. Such access is requested by several means, including a magnetic card having a magnetic strip that is passed over a magnetic reader for reading an identification access code encoded on the magnetic strip. A remote access requester receives the user-supplied commands and provides such commands to a controller that is typically located a distance from the remote access requester. Communication between the remote access requester and the controller is typically over a multiple conductor transmission line. If the user of the facility having a security systems desires to change such system, the user may need to install a multiple conductor transmission line, which can be costly.

Many security systems use a Wiegand standard interface for communicating data signals from the remote access requester and the controller. The Wiegand standard has five-conductor transmission lines for communicating power, ground, a lamp indicator signal, and two data lines for a one pulse and a zero pulse. Consequently, using a remote access requester and a controller implemented with the Wiegand standard cannot be used on a two-conductor transmission line infrastructure.

SUMMARY OF THE INVENTION

In accordance with the present invention, a remote access granting system includes a remote access requester, a remote access interface, a controller interface, and a controller. A first input of the remote access requester receives a user-supplied identification that includes code data having first and second logic states. A second input of the remote access requester receives a first access granted signal. The remote access requester has first and second outputs for providing corresponding first and second access request signals in response to a code datum being in the first and second logic states, respectively, and has a third output for providing an access accepted signal in response to the first access granted signal.

The remote access interface has first and second inputs coupled to the first and second outputs, respectively, of the remote access requester for receiving the corresponding first and second access request signals. An output of the remote access interface provides the first access granted signal in response to a second access granted signal. A bi-directional terminal of the remote access interface receives a DC voltage signal, receives the second access granted signal, modulates the DC voltage signal with a first modulating signal having a first pulsewidth in response to the first access request signal, and modulates the DC voltage signal with a second modulating signal having a second pulsewidth in response to the second access request signal.

The controller interface has an input for receiving a third access granted signal. A bi-directional terminal of the controller interface is coupled to the bi-directional terminal of the remote access interface for receiving the first and second modulated signals, for providing the DC voltage signal, and for modulating the DC voltage signal with the second access granted signal in response to the third access granted signal. A first output supplies a third access request signal in response to the first modulating signal. A second output supplies a fourth access request signal in response to the second modulating signal.

The controller has first and second inputs coupled to the first and second outputs, respectively, of the controller interface for receiving the third and fourth access request signals, respectively. An output of the controller is coupled to the input of the controller interface and provides the third access granted signal in response to the third and fourth access request signals matching a predetermined code data sequence.

DETAILED DESCRIPTION

Figure 1:
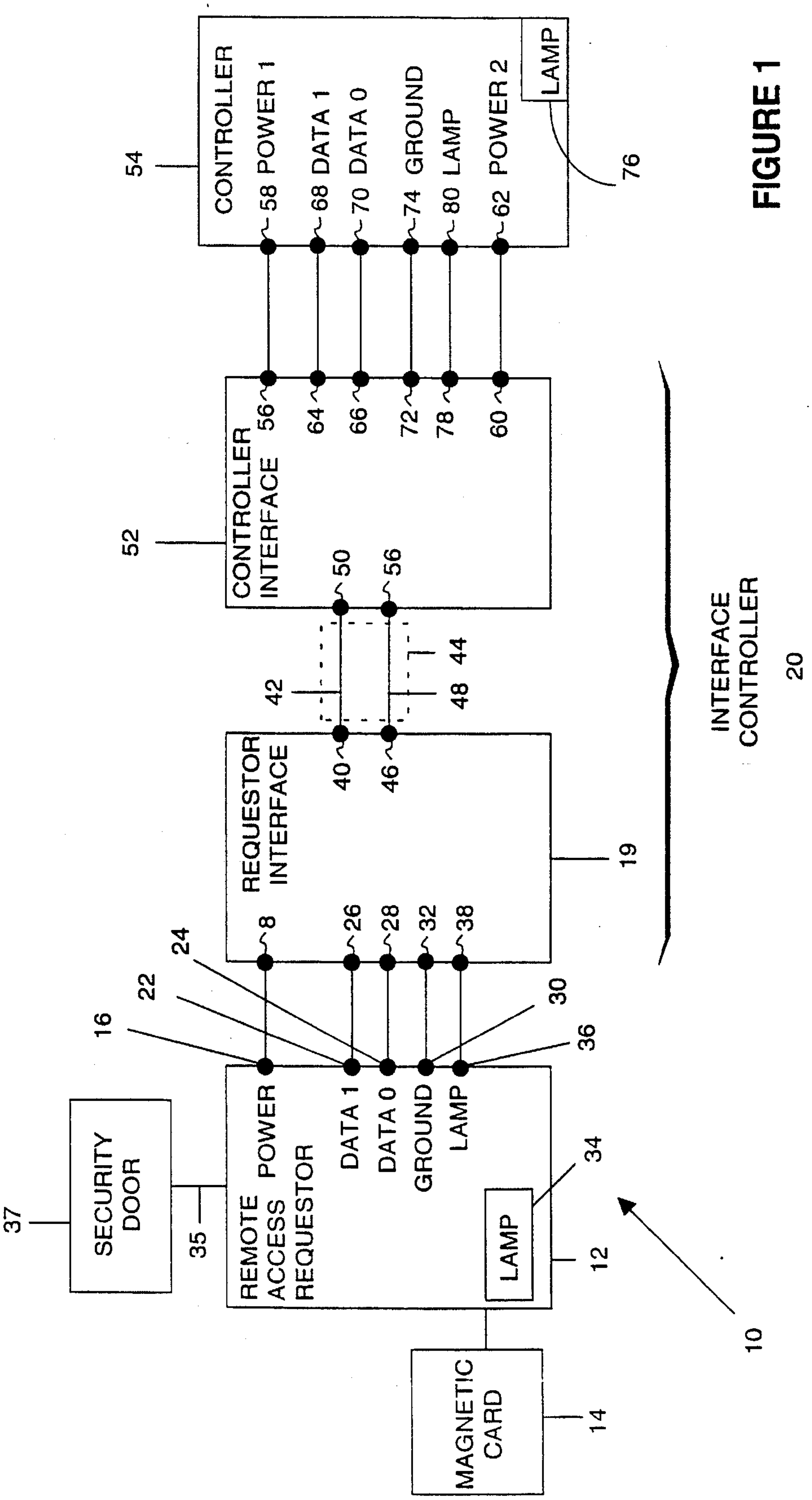
FIG. 1 is a block diagram illustrating a access control system according to principles of the invention.

Referring to FIG. 1, there is illustrated a access control system 10 according to principles of the invention. The access control system 10 has a remote access requester 12, later described herein, for providing access request signals in response to user-supplied commands. The remote access requester 12 may be, for example, a magnetic card reader for reading data encoded on a magnetic strip of a conventional magnetic card 14 as the user slides the card 14 through the reader. The magnetic card reader may be, for example, a Model RD350 magnetic card reader manufactured by Proprietary Control Systems Corporation of Rancho Dominguez, Calif. The remote access requester 12 has a power terminal 16 coupled to a corresponding power terminal 18 of a requester interface 19 of an interface translator 20 for communicating power and data, as later described herein, between the remote access requester 12 and the interface translator 20. The interface translator 20 typically provides power, for example +5 volts DC, to the remote access requester 12. The remote access requester 12 has a first data terminal 22 and a second data terminal 24 for communicating data with a corresponding first data terminal 26 and a corresponding second data terminal 28, respectively, of the requester interface 19. The remote access requester 12 has a ground terminal 30 coupled to a ground terminal 32 of the requester interface 19. The remote access requester 12 has a lamp 34 for providing an indication, later described herein, to a user. The remote access requester 12 has a lamp terminal 36 coupled to a corresponding lamp terminal 38 of the requester interface 19 for receiving a lamp enable signal to command the remote access requester 12 to illuminate the lamp 34. In response to the lamp enable signal, the remote access requester 12 provides an access granted signal 35 to a security door 37 to release a locking mechanism to allow the user access to an area behind the door 37.

The requester interface 19 has a bi-directional signal terminal 40 coupled to a first end of a signal line 42 of a communication channel 44 for receiving both power and the lamp enable signal and for communicating data and a ground terminal 46 coupled to a first end of a ground line 48 of the communication channel 44. The communication channel 44 may be, for example, a coaxial cable having a center conductor as the signal line 42 and a ground shield as the ground line 48. Alternatively, the communication channel may be, for example, a twisted-wire pair.

A second end of the signal line 42 is coupled to a bi-directional signal terminal 50 of a controller interface 52 which couples the interface translator 20 to a controller 54, later described herein. The controller 54 may be, for example, a Model RX2 controller manufactured by Proprietary Control Systems Corporation of Rancho Dominguez, Calif. Similarly, a second end of the ground line 48 is coupled to a ground terminal 56 of the controller interface 52. The controller interface 52 has a first power terminal 56 coupled to a corresponding first power terminal 58 of the controller 54 for communicating a first power signal between the controller 54 and the controller interface 52 and a second power terminal 60 coupled to a corresponding second power terminal 62 of the controller 54 for communicating a second power signal between the controller 54 and the controller interface 52. The controller 54 provides a DC voltage level, for example +12 volts DC and +5 volts DC, via the power terminal 60 and the power terminal 56, respectively, to the interface controller 52. As later described herein, the DC voltage level supplies power and provides a signal reference to the requester interface 19. Alternatively, the remote access requester 12 may be powered separately. The controller interface 52 has a first data terminal 64 and a second data terminal 66 for communicating data with a corresponding first data terminal 68 and a corresponding second data terminal 70, respectively, of the controller 54. The controller interface 52 has a ground terminal 72 coupled to a ground terminal 74 of the controller 54. The controller 54 has a lamp 76 for providing an indication, later described herein, to a user. The controller interface 52 has a lamp terminal 78 coupled to a corresponding lamp terminal 80 of the controller 54 for communicating a lamp enable signal (or an access granted signal) from the controller 54 to the controller interface 52.

The remote access requester 12 provides a first access request signal via the first data terminal 22 line to the requester interface 19 in response to a logic 1 read on the magnetic card 14. In response to the first access request signal, the requester interface 19 modulates the DC voltage level of the signal line 42 by a first modulating signal have a first pulsewidth. In a similar manner, the remote access requester 12 provides a second access request signal via the second data terminal 24 to the requester interface 19 in response to a logic 0 read on the magnetic card 14. In response to the second access request signal, the requester interface 19 modulates the DC voltage level of the signal line 42 by a second modulating signal having a second pulsewidth. Although the first and second access request signals are provided on separate lines, the remote access requester 12 provides the first and second access request signals sequentially. In a Wiegand standard system, the first and second access request signals are typically pulses having a 50 microsecond pulsewidth.

The requester interface 19 communicates the data provided to the requester interface 19 via the data terminals 26, 28 over the communication channel 44 to the controller interface 32. As later described herein, the requester interface 19 converts the data from the remote access requester 12 from the two-line data protocol to a second protocol which the controller interface 52 converts back into the two-line data protocol for communication with the controller 54.

Although the system 10 is described herein as an access control system, the invention is not so limited. The invention may be applied to inquiry/response systems or transaction systems where data is sent from a host, such as a controller, in response to identification data from a user.

Figure 2:
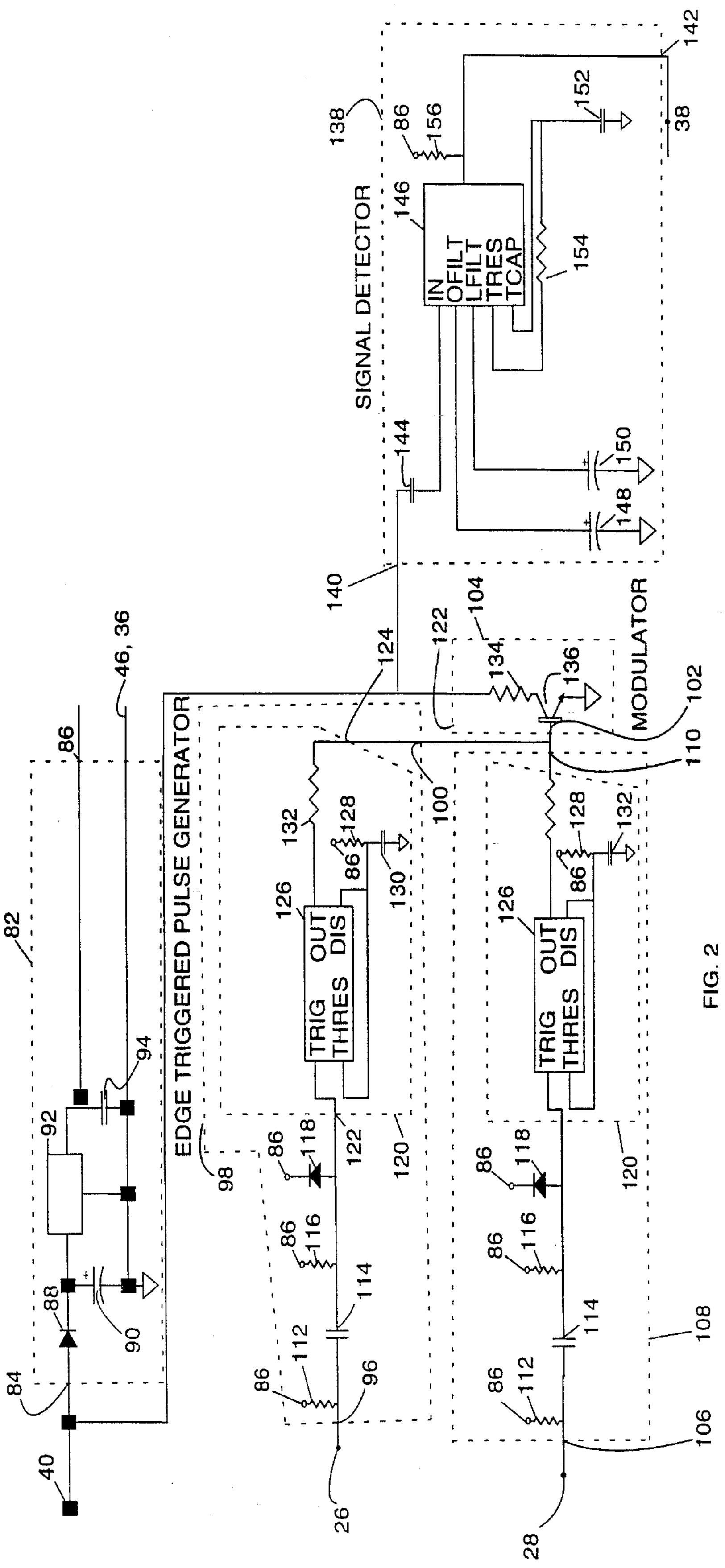
FIG. 2 is a schematic diagram illustrating a requester interface of the access control system shown in FIG. 1.

Referring to FIG. 2, there is shown a schematic diagram of the requester interface 19. The requester interface 19 has a power converter 82 for converting the voltage of the power signal provided by the controller interface 56 to a local voltage level Vcc and for regulating the local voltage level. Alternatively, the requester interface 19 may be powered separately. The power converter 82 has an input terminal 84 coupled to the signal terminal 40, which is coupled to the signal line 42 of the communication channel 44, and an output terminal 86 which provides the local voltage Vcc to the requester interface 19, as described later herein. An anode of an isolating diode 88 is coupled to the input terminal 84. A cathode of the isolating diode 88 is coupled to a first terminal of a filter capacitor 90 and to an input terminal of a voltage regulator 92. A second terminal of the filter capacitor 90 is coupled to ground. The voltage on the signal line 42 that is applied to the anode of the isolating diode 88 forward biases the diode 88 to isolate the power converter 82 from the signal terminal 40. A filter capacitor 94 couples a common node of an output terminal of the voltage regulator 92 and the output terminal 86 of the power converter 82 to ground. The voltage regulator 92 may be, for example, an LM7805 type voltage regulator commercially available from National Semiconductor.

An input terminal 96 of a first pulse generator 98 is coupled to the first data terminal 26 of the requester interface 19. An output terminal 100 of the first pulse generator 98 is coupled to an input terminal 102 of a modulator 104. The first pulse generator 98 supplies at the output terminal 100 a 'ones' pulse representing a logical one and having a first pulsewidth in response to a first pulse from the remote access requester 12 applied to the first data terminal 26 of the requester interface 19.

Similarly, an input terminal 106 of a second pulse generator 108 is coupled to the second data terminal 28 of the requester interface 19. An output terminal 110 of the second pulse generator 108 is coupled to the input terminal 102 of the modulator 104. The second pulse generator 108 supplies to the output terminal 110 a 'zeros' pulse representing a logical zero and having a second pulse width in response to a second pulse from the remote access requester 12 applied to the second data terminal 28 of the requester interface 19. The 'ones' pulse has a pulsewidth that is preferably about three times the pulsewidth of the 'zeros' pulse.

The first pulse generator 98 is identical to the second pulse generator 108 except for the value of a resistor as later described herein. A first pull-up resistor 112 couples the Vcc voltage source 86 to the input terminal 106 of the pulse generator 98, 108. A filter capacitor 114 couples the input terminal 106 of the pulse generator 98, 108 to an input terminal 122 of a monostable, or one-shot circuit 120. A second pull-up resistor 116 and a pull-up diode 118 each couple the voltage source 86 to the input terminal 122 of the one-shot circuit 120 which supplies a modulator-enable pulse at an output terminal 124 to the output terminal 100, 110 of the pulse generator 98, 108 for controlling the modulation applied by the modulator 104 to the signal line 42. The one-shot circuit 120 comprises a timer 126 having a trigger input coupled to the input terminal 122 of the one-shot circuit 120. The timer 126 may be, for example, an LM555C model timer commercially available from National Semiconductor. A resistor 128 couples the Vcc voltage source 86 to the common node of a threshold input and a discharge input of the timer 126, and a capacitor 130, which is coupled to ground. A reset terminal of the timer 126 is coupled to the Vcc voltage source 86. A current limiting resistor 132 couples an output terminal of the timer 126 to the output terminal 124 of the one-shot circuit 120.

The pulsewidth of the pulse provided by the pulse generator 98, 108 is determined in a conventional manner by the resistance of the resistor 128 and the capacitance of the capacitor 130. For a pulsewidth of the pulse supplied by the pulse generator 108 that is three times the pulsewidth of the pulse supplied by the pulse generator 98, the resistance of the resistor 128 in the pulse generator 108 is three times the resistance of the resistor 128 in the pulse generator 98 and the capacitance of the capacitors 130 in the pulse generators 98, 108 are equal. The pulsewidth of the 'ones' pulse is preferably 180 microseconds. The pulsewidth of the 'zeros' pulse is preferably 60 microseconds.

The modulator 104 has an output terminal 132 coupled to the signal terminal 40. The modulator 104 modulates the DC voltage level on the signal line 42 by pulling the DC voltage level low for a time duration equal to the pulse width of the pulse applied to the input terminal 102 of the modulator 104 by either the first pulse generator 98 or the second pulse generator 108. As later described herein, the controller interface 52 detects and decodes the modulation of the DC voltage level on the signal line 42.

The modulator 104 has a divider resistor 134 coupling the signal terminal 40 to the collector of a pull-down transistor 136. The base of the pull-down transistor 136 is coupled to the input terminal 102 of the modulator 104 to thereby couple to the output terminal 100 of the first pulse generator 98 and to the output terminal 110 of the second pulse generator 108. The emitter of the pull-down transistor 136 is coupled to ground. The pull-down transistor 136 may be, for example, a 2N4401 model npn transistor commercially available from National Semiconductor. Alternatively, the pull-down transistor may be a FET transistor.

The pull-down transistor 136 is enabled when either pulse generator 98, 108 applies a pulse to the input terminal 102 of the modulator 104. When enabled, the pull-down transistor 136 conducts and pulls the voltage level at its collector to ground. A dividing resistor 157, later described herein, in the controller interface 52, coupled between the second power terminal 60 and the signal terminal 50 of the controller interface 52 provides a voltage divider with the divider resistor 134 to pull down the voltage on the output terminal 132 of the modulator 104 to thereby cause the voltage on the signal line 42 to correspondingly be pulled down. The pulse generators 98, 108 remove the pulse applied to the input terminal 102 to disable the pull-down transistor 136. Disabling the pull-down transistor 136 allows the voltage level of the signal line 42 to be driven by the controller interface 42 and to return to its normal DC voltage level. As later described herein, the controller interface 42 detects the modulated data on the signal line 42 and converts the modulation into the two line pulse standard. Alternatively, the controller interface 42 may convert the modulated data into a pulse standard different than the pulse standard of the data received at the requester interface 19.

A signal decoder 138 has an input terminal 140 coupled to the signal terminal 40 and an output terminal 142 coupled to the lamp terminal 38. The signal decoder 138 monitors the voltage level on the signal line 42. Upon detecting a tone signal modulated on the DC voltage level, later described herein, the signal decoder 138 provides a lamp enable signal to its output terminal 142 to communicate to the remote access requester 12. In response to the lamp enable signal, the remote access requester 12 enables the lamp 34 to illuminate and thereby communicate an indication signal to the user. For example, the remote access requester 12 may use the lamp enable signal to disable a lock to allow a user entry through the security door 37.

The signal detector 138 has a coupling capacitor 144 for passing modulated signals on the signal line 42 coupling the input terminal 140 of the signal detector 138 to an input terminal of a phase lock loop 146. The phase lock loop may be, for example, an LM567 type phase lock loop integrated circuit commercially available from National Semiconductor. A filter capacitor 148 couples a OFILT terminal of the phase lock loop 146 to ground. Similarly, a filter capacitor 150 couples a LFILT terminal of the phase lock loop 146 to ground. A resistor 154 couples a TRES input of the phase lock loop 146 to a TCAP terminal of the phase lock loop 146. A tuning capacitor 152 couples the TCAP input of the phase lock loop 146 to ground. The resistor 154 and the tuning capacitor 152 determine the frequency of the signal that the phase lock loop 146 responds to. An output terminal of the phase lock loop 146 is coupled to the common node of the output terminal 142 of the signal detector 138 and to a pull-up resistor 156 coupled to the voltage source VCC 86.

Figure 3:
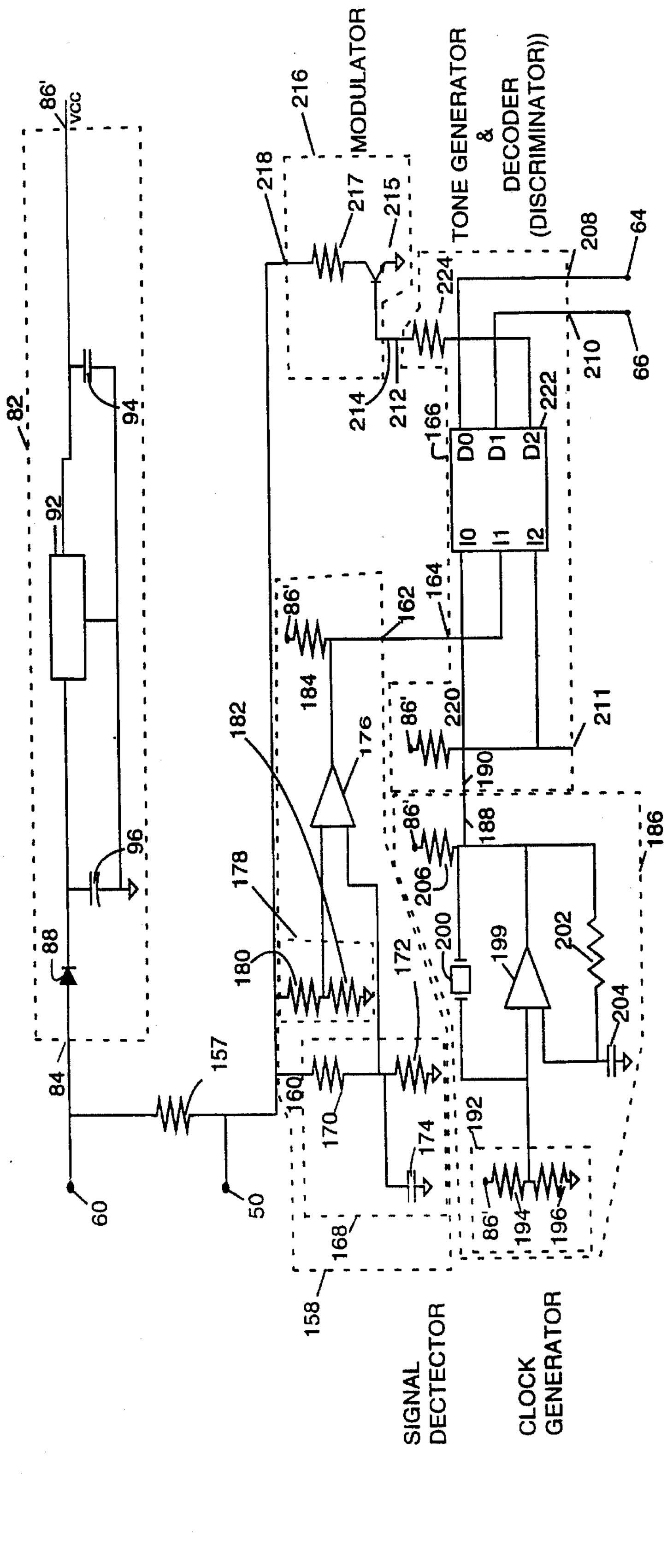
FIG. 3 is a schematic diagram illustrating a controller interface of the access control system shown in FIG. 1.

Referring to FIG. 3, there is illustrated a schematic diagram of the controller interface 52. The controller interface 52 has a power converter 82, similar to that of the requester interface 19, for converting the voltage of a power signal provided by the controller 54 to a local Vcc voltage level 86'. Alternatively, the controller interface 52 may be powered separately. Although the power converter 82 of FIG. 3 is shown as being identical to the power converter of FIG. 2, the invention is not limited as such. The regulation of the power signal and the voltage level Vcc of the controller interface 52 may be different than the regulation of the power signal and the voltage level of the requester interface 19. A dividing resistor 157 couples the power terminal 60 to the power terminal 56. As described earlier herein, the dividing resistor 157 forms a voltage divider with the dividing resistor 134 in the requester interface 19 for setting the modulation voltage of the DC voltage signal on the signal line 42. As described later herein, the dividing resistor 157 is similarly used to set the voltage for the access granted signal.

A signal detector 158 has an input terminal 160 coupled to the signal terminal 50 of the controller interface 52 and an output terminal 162 coupled to a first input terminal 164 of a tone generator 166. The signal detector 158 detects the changes in the voltage level on the signal line 42 modulated thereon by the requester interface 19. In response to the detected changes, the signal detector 158 supplies a pulse detect signal to the tone generator 166 in response to a detected pulse on the signal line 42. The pulse detect signal has a first pulsewidth, in response to a first pulse, and has a second pulsewidth, in response to a second pulse.

The signal detector 158 has a first voltage divider 168 for providing a first reference voltage that is an "average" voltage on the signal line 42 to a negative input of a comparator 176. The first voltage divider 176 has a first dividing resistor 170 coupling the input 160 of the signal detector 158 to a common node of the negative input of the comparator 176, a second dividing resistor 172, and a filter capacitor 174, each coupled to ground. A second voltage divider 178 provides a second reference voltage that is an "instantaneous" voltage on the signal line 42 to the positive input of the comparator 176. The second voltage divider 178 has a third dividing resistor 180 coupling the input of the signal detector 50 to the common node of a fourth dividing resistor 182, which couples the node to ground, and to the positive input of the comparator 176. The first reference voltage is preferably less than the second reference voltage to provide a window for triggering the comparator. An output of the comparator 176 supplies to the output terminal 162 of the signal detector 158 a pulse having a pulsewidth equal to the modulation on the signal line 42 and having an amplitude corresponding to discrete logic levels. A pull-up resistor 184 couples the output terminal 162 to the Vcc voltage source 86'.

A clock generator 186 has an output terminal 188 for supplying a clock signal for a timing reference and for a modulation signal to a second input terminal 190 of the tone generator 166. The clock generator 186 comprises a voltage divider 192 having a first dividing resistor 194 coupling to the Vcc voltage source 86' to a positive input of a comparator 198. A second dividing resistor 196 couples the positive input of the comparator 198 to ground. A comparator 198 has a positive input coupled to the second terminal of the first dividing resistor 194 and to a first terminal of a crystal oscillator 200, a negative input coupled to a first terminal of a feedback resistor 202 and to a first terminal of a filter capacitor 204, and an output coupled to a second terminal of the feedback resistor 202, a second terminal of the crystal oscillator 200, and the output terminal 188 of the clock generator 186. The frequency of the oscillator 200 may be, for example, 32.768 KHz. A pull-up resistor 206 couples the output of the comparator 198 to the Vcc voltage source 86'.

The tone generator and decoder 166 (or discriminator), later described herein, has a first output terminal 208, coupled to the first signal terminal 64 on the controller interface 52, for providing a third access request signal in response to a pulse detect signal having the first pulsewidth and a second output terminal 210, coupled to the second signal terminal 66 on the controller interface 52, for providing a fourth access request signal in response to a pulse detect signal having the second pulsewidth. The tone generator 166 has a third input terminal 211 for receiving a lamp enable signal from the lamp terminal 78 of the controller interface 52. In response to the lamp enable signal applied to the lamp terminal 78 by the controller 54, the tone generator 166 provides at a lamp output terminal 212 the lamp enable signal to an input terminal 214 of a modulator 216.

The modulator 216 has a dividing resistor 217 coupling a transistor 219 to the common node of an output terminal 218, the signal terminal 50 of the controller interface 52, and the dividing resistor 157. In a manner similar to that described above for the modulator 104 of the requester interface 19, the modulator 216 pulls down the voltage level of the signal line 42 in response to a lamp enable signal applied to the input terminal 211 of the modulator 216. The voltage division of the dividing resistor 157 and the dividing resistor 217 generates a modulation amplitude of the voltage level for the lamp enable signal that is less than the amplitude of the zeros and ones signals on the signal line 42. The level of the signal detected by the signal detector 158 is preferably set by the resistance of the dividing resistor 217 so that the signal detector 158 detects the first and second modulating signals and does not detect the lamp enable signal.

The tone generator 166 has a pull-up resistor 220 coupling the Vcc power source 86' to the common node of the third input terminal 211 of the tone generator 166 and a I2 input of a pulse analyzer 222. The pulse analyzer 222 may be, for example, a 22 V10 programmable array logic device. Alternatively, the pulse analyzer 222 may be implemented using discrete logic. The input terminal 164 of the tone generator 166 applies the pulse detect signal to an I1 input of the pulse analyzer 222. The input terminal 190 of the tone generator 166 applies the clock signal to an I0 input of the pulse analyzer 222. A D0 output of the pulse analyzer 222 supplies the third access request signal to the output terminal 208 for communicating with the controller 54. Similarly, a D1 output of the pulse analyzer 222 supplies the fourth access request signal to the output terminal 210 for communication with the controller 54. A current limiting resistor 224 couples the D2 output of the pulse analyzer 222 to the output terminal 212 of the tone detector 166 for supplying a lamp-enabling signal to the input terminal 214 of the modulator 216.

The logic equations for the pulse analyzer 212 are as follows:

t0:=sig*/t4 +t0*/t4 (1)

t1:=t0*/t4 (2)

t2:=t1*/t4 (3)

t3:=t2*/t4 (4)

t4:=t3*/t4 (5)

dit:=t2*/t4*/sig*/dah+dit*/t4 (6)

dah:=t2*/t4*sig*/dit+dah*/t4 (7)

q0:=/q0*lamp+/lamp (8)

where sig is the pulse detect signal applied to the input terminal 164 of the tone generator 166, lamp is the lamp enable signal applied to the input terminal 218 of the tone detector, q0 is the output signal from the D2 terminal of the pulse analyzer 222, dit is the output signal from the D1 terminal of the pulse analyzer 222, dah is the output signal from the D0 terminal of the pulse analyzer 222, "*" is an AND operation, "+" is an OR operation, "/" is a not operation, and ":=" is a clocked equal operator where the output at the next clock cycle is the value of the variables to the right of the operator that are determined for the present clock cycle. In this implementation, the frequency of q0 signal (and thereby the frequency of the modulation of the voltage signal on the signal line 42) is constant and different than the frequency of the modulation of the remote access request signals.

Figure 4:
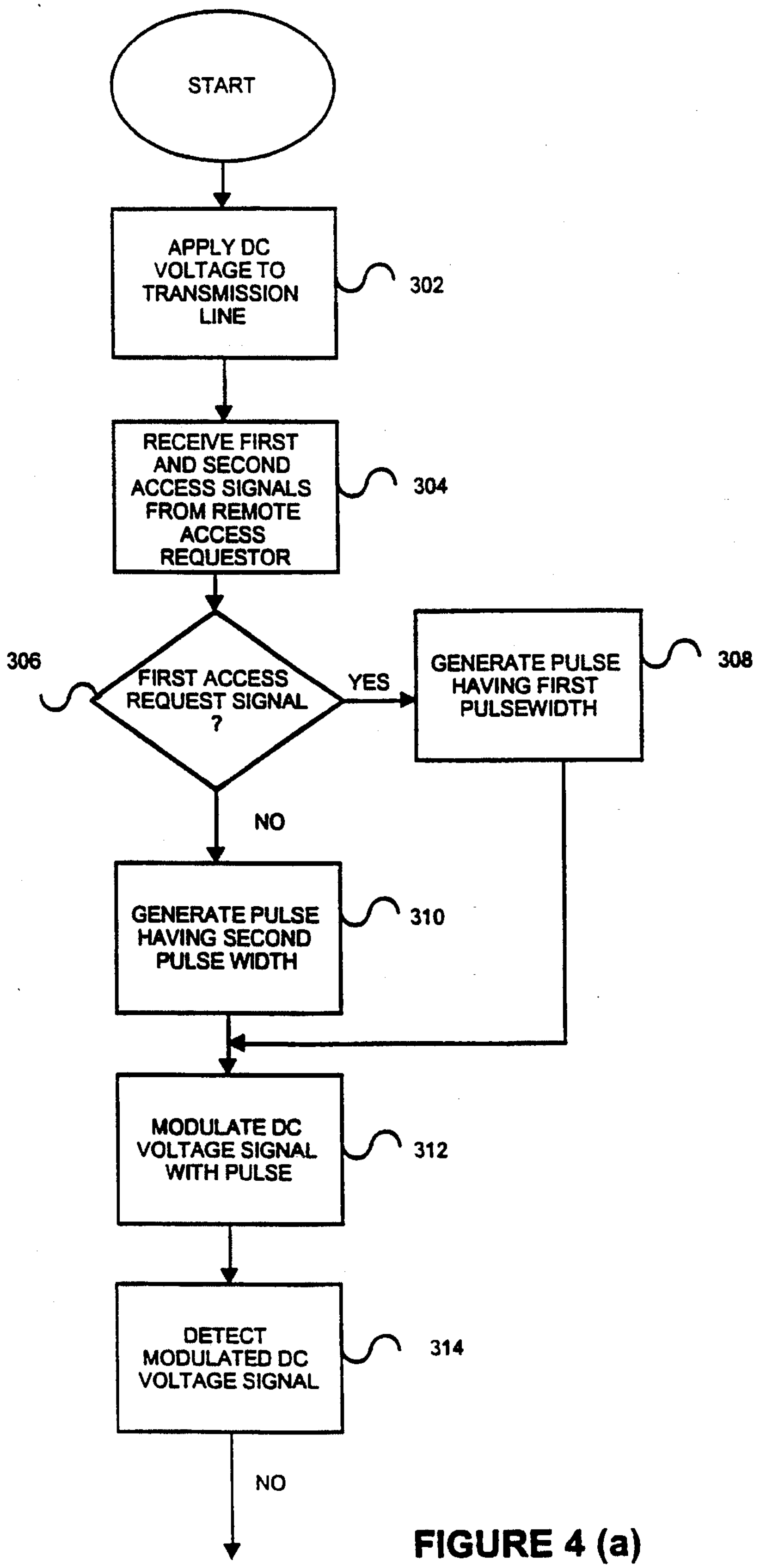
FIGS. 4(*a*) and 4(*b*) are flowcharts illustrating the operations of the access control system of FIG. 1.
Figure 4:
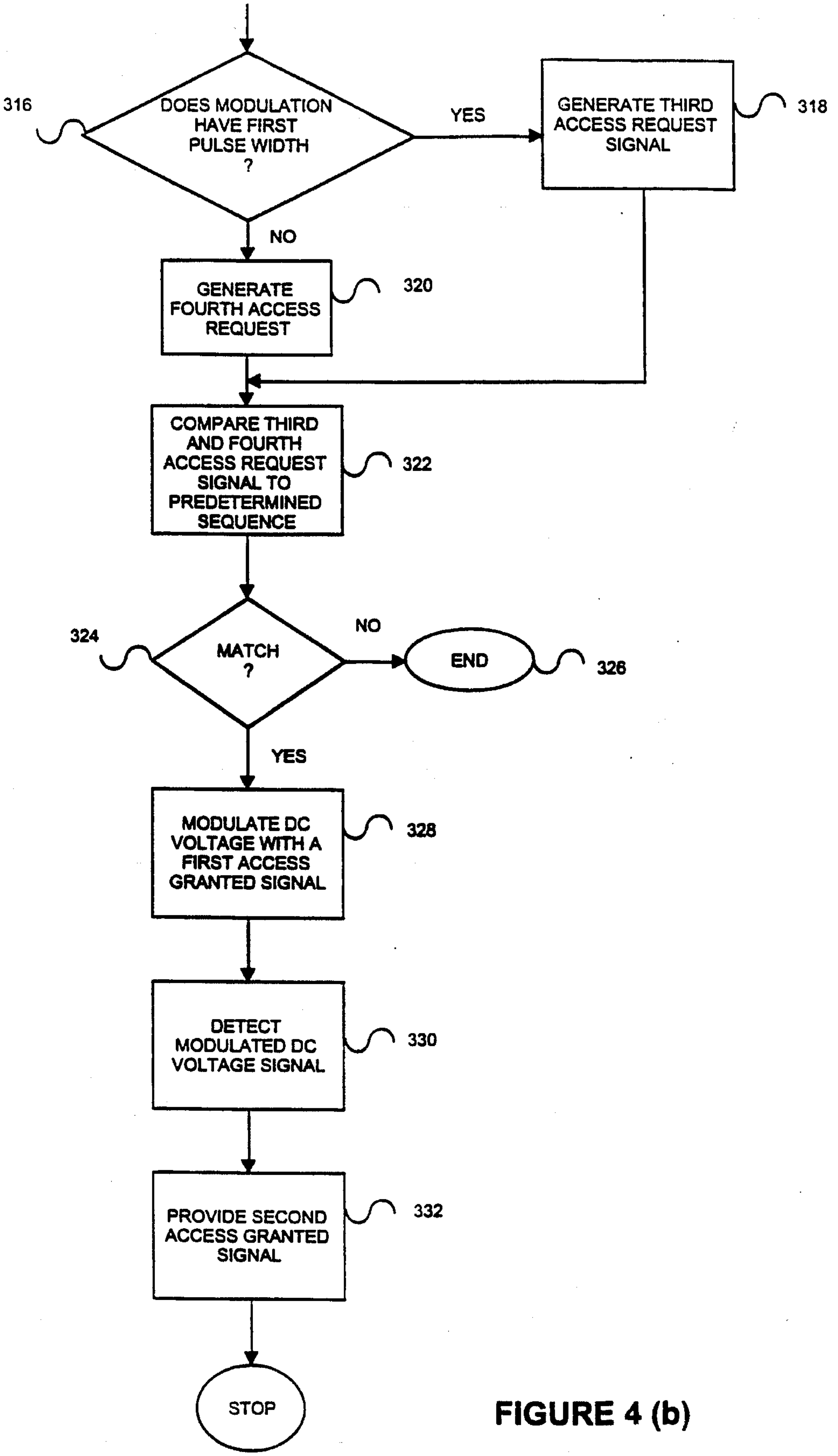

Referring to FIGS. 4(*a*) and 4(*b*), there are shown flowcharts illustrating the operation of the access control system. The controller interface 52 applies 302 a DC voltage signal to the signal line 42. The requester interface 19 receives 304 a sequence of first and second access request signals indicative of first and second logic conditions, respectively. If the received signal is a first access request signal 306, the requester interface 19 generates 308 a pulse having a first pulsewidth. On the other hand, if the received signal is a second access request signal 306, the requester interface 19 generates 310 a pulse having a second pulsewidth. The requester interface 19 modulates 312 the DC voltage level of the signal line 42 with the pulse. The controller interface 52 detects 314 the modulated DC voltage signal. If the modulated voltage signal has a first pulsewidth 316, the controller interface 52 generates 322 a third access request signal and provides the signal to the controller 54. On the other hand, if the modulated voltage signal has a second pulsewidth 316, the controller interface 52 generates 320 a fourth access request signal and provides the signal to the controller 54.

The controller 54 compares 322 the sequence of third and fourth access request signals to a predetermined sequence of signals. If there is no match between the sequence of third and fourth access request signals and the predetermined sequence of signals 324, the system ignores 326 the request. Alternatively, the controller 54 may send an access denied signal to the remote access requester 12. On the other hand, if there is a match 324, the controller interface 52 applies 328 to the second end of the signal line 42 a first access granted signal for modulating the DC voltage level of the power signal. The requester interface 19 detects 330 the modulated DC voltage level of the power signal and provides 332 to the remote access requester 12 a second access granted signal, such as a lamp enable signal.

Alternatively, either of the modulators 104, 216 or both may modulate the DC voltage signal by pulling up the voltage of the voltage signal by momentarily raising by capacitive coupling a positive voltage transition on the DC voltage signal. Alternatively, a hybrid system may modulate the DC voltage signal by a positive voltage signal for one type of data and by a negative voltage signal for another type of data.

By providing a negative voltage modulation for a first remote access interface and a positive voltage modulation for a second remote access interface, multiple readers may be coupled to a single communication channel 44.

Therefore, the access control system 10 converts access request data received per a Wiegand five-wire protocol into a two-wire protocol for transmission over the coaxial cable 44 or a twisted pair by pulse modulating a DC voltage level on one of the wires. The modulation is detected at the controller interface 52 and converted into a Wiegand protocol for communication to a controller 54. Upon a match between the access request data and the predetermined data, the controller 54 provides an access granted signal to the controller interface 52 which then modulates the DC voltage level with another modulating signal. The requester interface 19 detects the modulating signal and provides an access granted signal, such as a lamp enable signal, to the remote access requester 12 for illuminating a lamp and for disengaging the lock of the security door 37.

I claim:

1. A remote access granting system comprising:

a remote access requester having a first input for receiving a user-supplied identification code including code data having first and second logic states, having a second input for receiving a first access granted signal, having first and second outputs for providing corresponding first and second access request signals in response to a code datum being in the first and second logic states, respectively, and having a third output for providing an access accepted signal in response to the first access granted signal;

a remote access interface having first and second inputs coupled to the first and second outputs, respectively, of the remote access requester for receiving the corresponding first and second access request signals, having an output for providing the first access granted signal in response to a second access granted signal, and having a bi-directional terminal for receiving a DC voltage signal, for receiving the second access granted signal, for modulating the DC voltage signal with a first modulating signal having a first pulsewidth in response to the first access request signal and for modulating the DC voltage signal with a second modulating signal having a second pulsewidth in response to the second access request signal;

a controller interface having an input for receiving a third access granted signal, having a bi-directional terminal coupled to the bi-directional terminal of the remote access interface for receiving the first and second modulated signals, for providing the DC voltage signal, and for modulating the DC voltage signal with the second access granted signal in response to the third access granted signal, having a first output for supplying a third access request signal in response to the first modulating signal, and having a second output for supplying a fourth access request signal in response to the second modulating signal; and a controller having first and second inputs coupled to the first and second outputs, respectively, of the controller interface for receiving the third and fourth access request signals, respectively, and having an output coupled to the input of the controller interface for providing the third access granted signal in response to the third and fourth access request signals matching a predetermined code data sequence.

2. The remote access granting system of claim 1 wherein the first access request signal is a pulse signal indicative of the first logic state, the second access request signal is a pulse signal indicative of the second logic state, the third access request signal is a pulse signal indicative of the first logic state, the fourth access request signal is a pulse signal indicative of the second logic state, and the access granted signal is a lamp indicator signal.

3. A remote access communication interface for communicating data over a single transmission line between a remote access requester and a controller, the remote access requester having an input for receiving a first access granted signal and having first and second outputs for providing corresponding first and second access request signals indicative of first and second logic states, respectively, the controller having first and second inputs for receiving third and fourth access request signals indicative of the first and second logic states and having an output for providing a second access granted signal, the remote access communication interface comprising:

a remote access interface having first and second inputs coupled to the first and second outputs, respectively, of the remote access requester for receiving respective first and second access request signals, having an output coupled to the input of the remote access requester for providing the first access granted signal in response to the second access granted signal, and having a bi-directional terminal coupled to the transmission line for receiving a DC voltage signal, for receiving a third access granted signal, for modulating the DC voltage signal with a first modulating signal having a first pulsewidth in response to the first access request signal, and for modulating the DC voltage signal with a second modulating signal having a second pulsewidth in response to the second access request signal; and a controller interface having a first input coupled to the output of the controller for receiving the second access granted signal, having a bi-directional terminal coupled to the transmission line for receiving the first and second modulating signals, for applying the DC voltage signal to the transmission line, and for forming the third access granted signal by modulating the DC voltage signal in response to the second access granted signal, and having first and second outputs for providing the third and fourth access request signals to the first and second inputs, respectively, of the controller in response to the first and second modulating signals, respectively.

4. The remote access communication interface of claim 3 wherein the first access request signal is a pulse signal indicative of the first logic state, the second access request signal is a pulse signal indicative of the second logic state, the-third access request signal is a pulse signal indicative of the first logic state, the fourth access request signal is a pulse signal indicative of the second logic state.

5. The remote access communication interface of claim 3 wherein, the third access granted signal modulates the DC voltage signal at an amplitude less than the amplitude of the first and second modulating signals and at a frequency different than the frequency of the first and second modulating signals.

* * * * *